Nov. 15, 1932.   P. H. FILBIN   1,887,805
HARVESTER
Filed May 23, 1930   4 Sheets-Sheet 1

Inventor
P. H. Filbin
By Clarence A. O'Brien
Attorney

Nov. 15, 1932.  P. H. FILBIN  1,887,805
HARVESTER
Filed May 23, 1930  4 Sheets-Sheet 2

Inventor
P. H. Filbin
By Clarence A O'Brien
Attorney

Nov. 15, 1932. P. H. FILBIN 1,887,805
HARVESTER
Filed May 23, 1930 4 Sheets-Sheet 4

Inventor
P. H. Filbin

By Clarence A. O'Brien
Attorney

Patented Nov. 15, 1932

1,887,805

UNITED STATES PATENT OFFICE

PATRICK HENRY FILBIN, OF LIBERAL, KANSAS

HARVESTER

Application filed May 23, 1930. Serial No. 455,115.

This invention relates to agricultural implements or machines and more particularly to a grain harvester and has for its primary object to provide, in a manner as hereinafter set forth, a device of this character embodying a novel construction and arrangement of parts for expeditiously cutting and threshing the grain, the invention further providing means for cleaning the threshed grain and conveying the same to a suitable hopper or bin.

Other objects of the invention are to provide a harvester of the aforementioned character which will be comparatively simple in construction, strong, durable, efficient in its use and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 3:
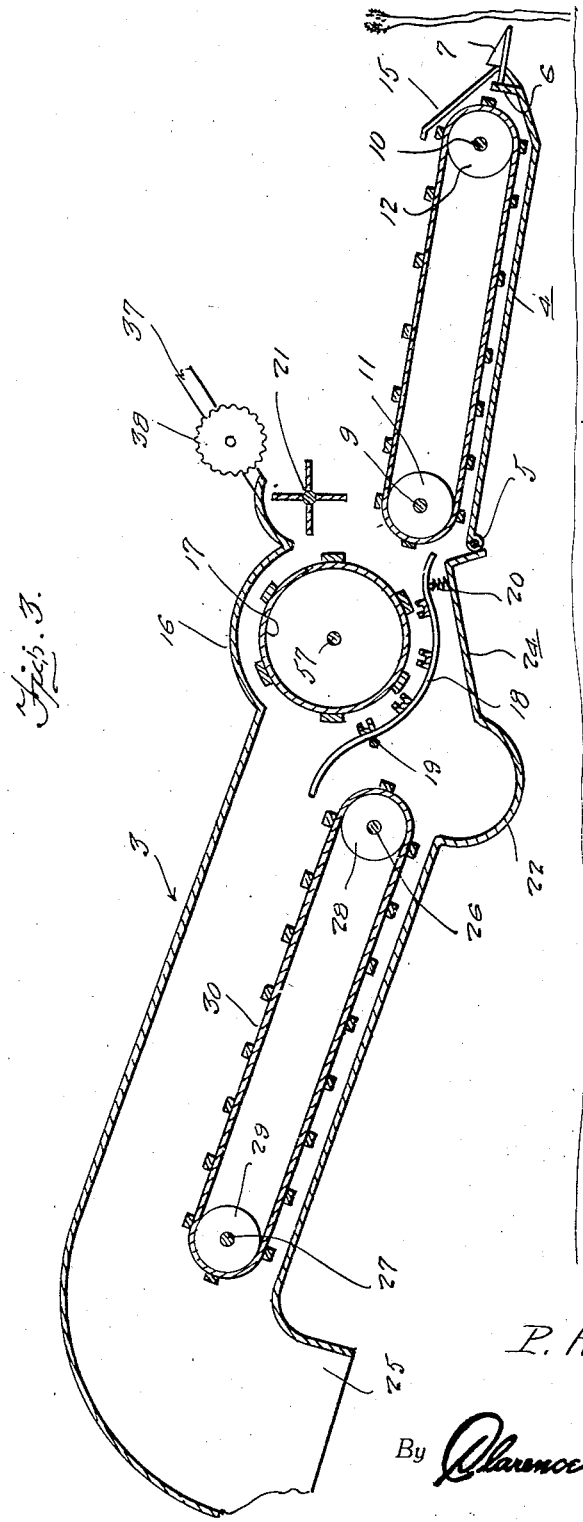
Figure 3 is a longitudinal sectional view on an enlarged scale showing the cutting and threshing mechanism taken substantially on the line 3—3 of Figure 1 and looking in the direction indicated by the arrow.

Referring to the drawings in detail, it will be seen that the reference numeral 1 designates an axle upon the opposite end portion of which are rotatably mounted the supporting wheels 2. A metallic housing or casing designated generally by the reference numeral 3 is supported beneath the axle 1 and a pan 4 is hingedly mounted, as at 5 to the lower forward portion of the housing 1. The pan 4 is provided with an upturned forward end portion 6 upon which is operatively mounted a reciprocating cutter mechanism of conventional construction 7. The pan 4 is provided with the side walls 8 and journaled for rotation therethrough are the opposite end portions of a pair of transverse shafts 9 and 10, the shaft 9 being disposed above the rear portion of said pan 4 and the shaft 10 being disposed above the front portion of said pan. Pairs of rollers 11 and 12 are fixed on the shafts 9 and 10, respectively, and trained over said rollers are the endless aprons 13, (see Figure 1). A supporting bar 14 is provided intermediate the aprons 13 for rotatably supporting the intermediate portions of the shafts 9 and 10. An inclined plate 15 extends upwardly from the cutters 7 to a point above the forward end portion of the aprons 13, as illustrated to advantage in Figure 3 of the drawings.

Figure 2:
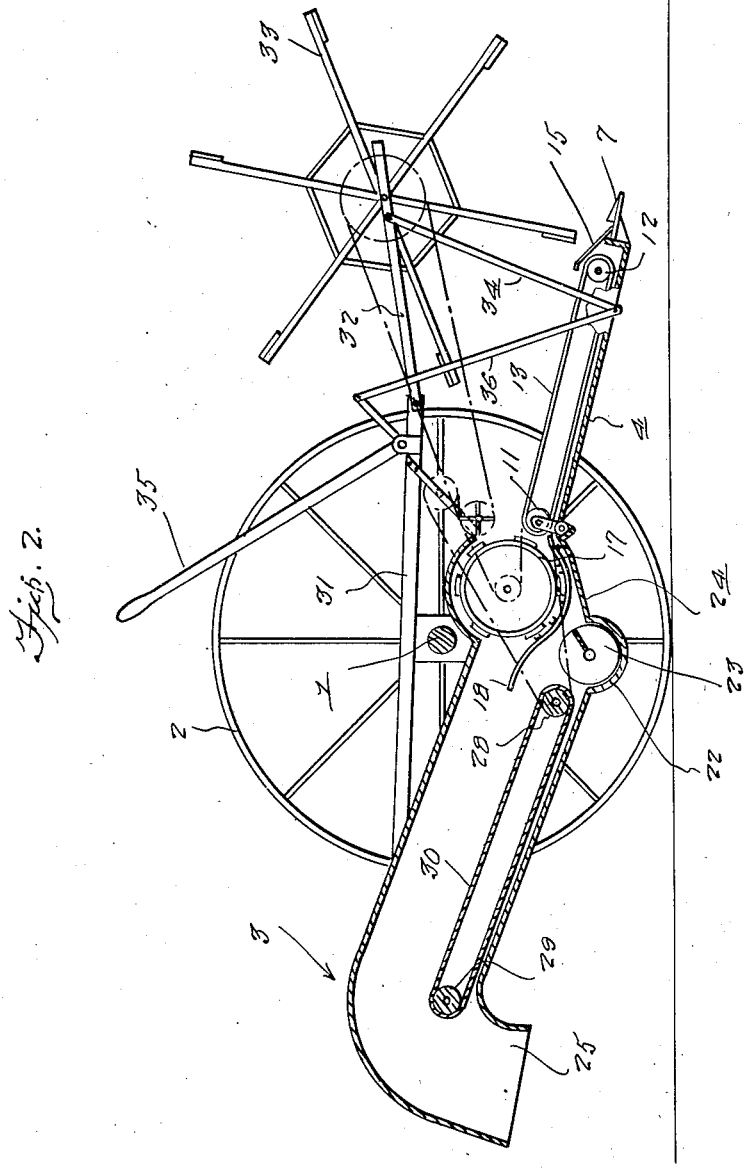
Figure 2 is a view partially in vertical longitudinal section taken substantially on the line 2—2 of Figure 1 and partially in side elevation, the operator's platform, the reel and the reel supporting and adjusting means being shown in side elevation.

The housing 3 has its upper wall formed to provide a transverse raised portion 16 of arcuate cross section to accommodate the upper portion of the breaker cylinder 17 which is mounted for rotation in said housing and disposed above the concave 18 which is mounted for rocking movement on the shaft 19 and has its forward end yieldably supported on a coil spring 20. A beater 21 is also mounted for rotation in the housing 3 above the rear end portion of the aprons 13. A trough 22 is formed in the bottom wall of the housing 3 rearwardly of the vertical plane of the cylinder 17 and extending transversely across the housing. A screw conveyor 23 (see Figure 2) is mounted for rotation in the trough 22. It will be apparent that the trough 22 is adapted to receive the grain from the concave 18 and the conveyor 23 is for the purpose of moving said grain to a cleaning apparatus to be presently described. The portion of the housing immediately forward of the trough 22 is inclined toward said trough in order that grain will gravitate thereinto.

The portion of the housing 3 which is rearwardly of the trough 22 is formed to constitute a rearwardly and upwardly extending discharge passage which terminates in a downturned end portion 25. Shafts 26 and 27 are mounted for rotation in the discharge passage and fixed on said shafts are the rollers 28 and 29, respectively, over which is trained the conveyor 30. The forward end of the conveyor 30 is disposed beneath the discharge end of the concave 18 to receive the straw therefrom.

The reference numeral 31 designates an operator's platform to the forward end portion of which is pivotally connected a pair of forwardly projecting arms 32 which rotatably support the reel 33 therebetween. The arms 32 are pivotally connected to the pan 4 for swinging movement therewith through the medium of the links 34. A bell crank hand lever 35 is mounted for swinging movement on the forward portion of the platform 31 adjacent one side thereof and is operatively connected to the pan 4 through the medium of the connecting bar 36.

Braces 37 extend from the forward upper portion of the housing 3 at the opposite sides thereof to the platform 31 and mounted for rotation on intermediate portions of said braces are the idling sprockets 38, the purpose of which will also be presently set forth. The reference numeral 39 designates a pair of shoes disposed on opposite sides of the pan 4 and adapted to direct the grain inwardly into engagement with the cutter bar.

Figure 1:
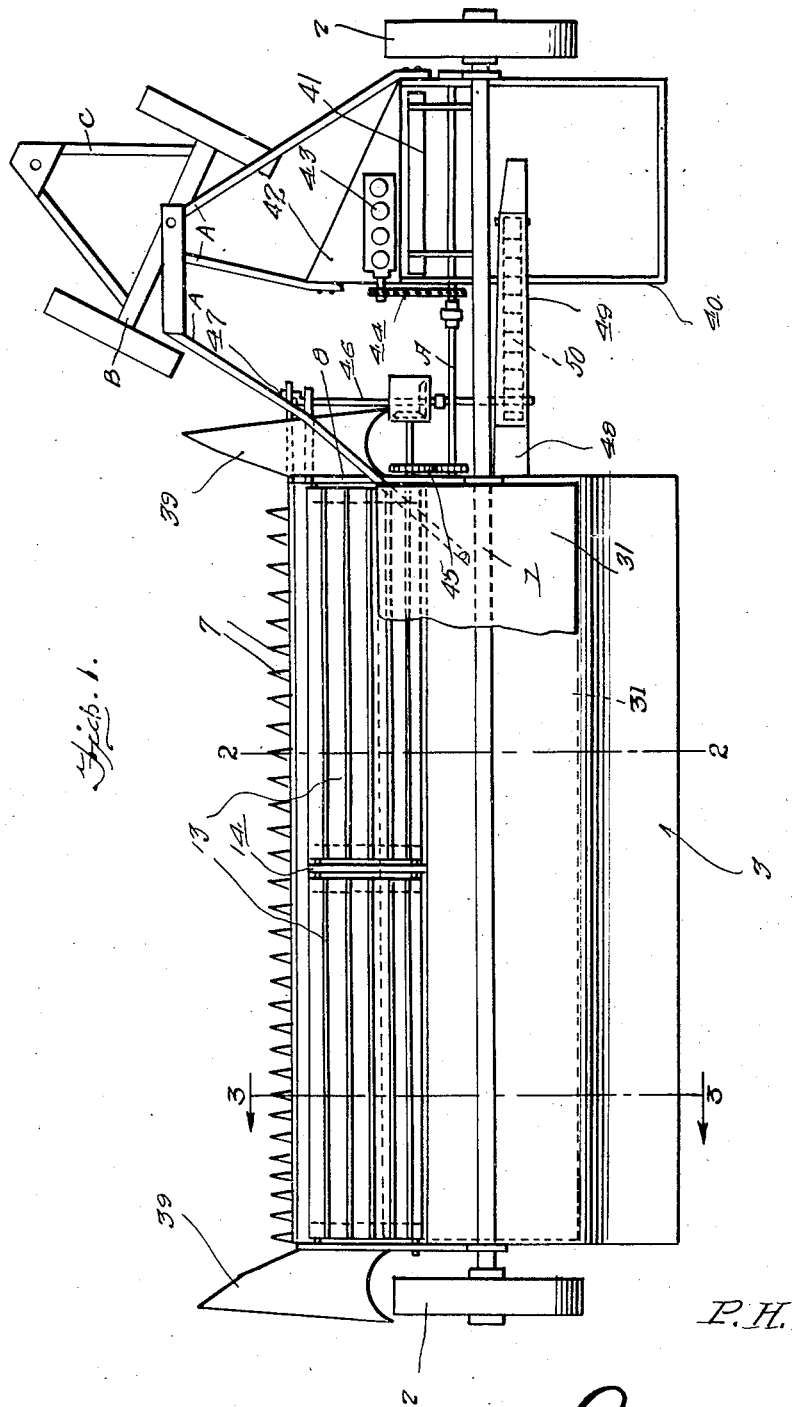
Figure 1 is a top plan view of a harvester constructed in accordance with this invention with the reel and the supporting and adjusting means therefor removed and showing the operator's platform in dotted lines.

Also mounted on the axle 1 and disposed in spaced relation to one side of the housing 3 as best seen in Figure 1, is a hopper 40. The shaft 9 which carries the rollers 11 extends rotatably through the forward lower portion of the hopper 40 and has fixed thereon within said hopper a fan or blower 41. A platform 42 is disposed forwardly of the hopper 40 to support an engine 43 which is operatively connected to the shaft 9 for actuating said shaft through the medium of the drive chain 44. The shaft A is operatively connected as at 45 through the medium of meshed gears to the shaft 9 for actuating the same. Said shaft 9 has one end projecting beyond the pan 4 toward the hopper 40 and is operatively connected to a longitudinally disposed shaft 46 having a crank 47 on its forward end which is operatively connected to the cutter bar in a manner to actuate the same.

Figure 4:
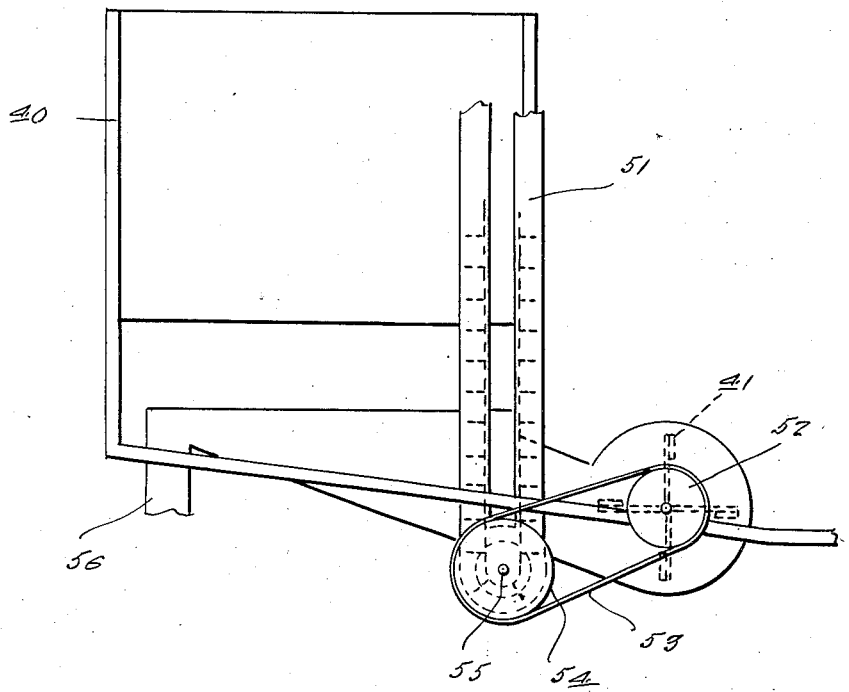
Figure 4 is a view in side elevation of the cleaning mechanism and the elevator.

An extension 48 is provided for the trough 22 in which is housed a projecting end portion of the screw conveyor 23 and a conduit 49 extends upwardly from said extension and has its discharge end disposed above the hopper 40. The shaft 46 extends through the lower portion of the conduit 49 and is operatively connected to an endless conveyor 50 which travels through the conduit in a manner to elevate the grain from the conveyor 23 and discharge the same into the hopper 40. As best illustrated in Figure 4 of the drawings, an elevator 51 is mounted on one side of the hopper 40 to receive the cleaned grain and move the same to a suitable receptacle provided therefor (not shown). The elevator 51 is operatively connected to a pulley 52 fixed on an end portion of the shaft A which projects through the hopper 40 through the medium of an endless belt 53 which is trained over the pulley 54 fixed on the lower shaft 55 of said elevator 51. A return conduit 56 is provided for conducting a certain portion of the grain to the mechanism which delivers said portion into the hopper 40 for the purpose of again subjecting said certain portion to the cleaning action of the fan or blower 41.

Figure 5:
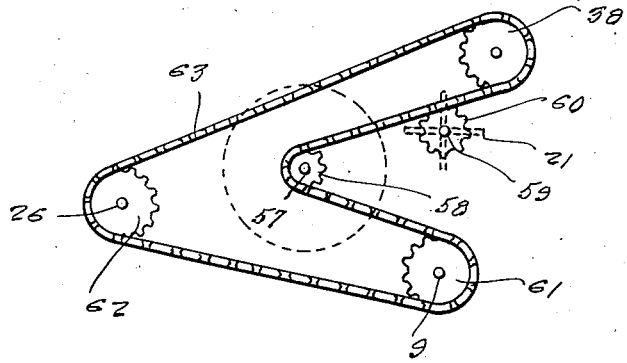
Figure 5 is a detail view showing the arrangement of the driving mechanism for the various elements.

The cylinder 17 is supported on a shaft 57 having fixed on one end a sprocket gear 58 (see Figure 5). The shaft 59 which supports the beater 21 has fixed thereon a sprocket gear 60, the shaft 9 which supports the rollers 11 has fixed thereon a sprocket gear 61 and the shaft 26 which supports the roller 28 has fixed thereon a sprocket gear 62. An endless drive chain 63 is trained over the idle sprocket gear 38 and operatively engaged with the sprocket gear 60 and over the sprocket 58 and from there said chain travels over the sprocket gear 61 and then over the sprocket gear 62 in a manner to operatively connect all of said sprocket gears together for actuation by the shaft 9.

The machine is attached to a tractor by suitable means such as the rearwardly diverging bars A which may be secured to the hopper 40 and the platforms 31 and 42 as shown in Figure 1 of the drawings, the forward ends of the bars A being connected together and supported on the truck B which is adapted for swinging movement and which is provided with a tongue C for connection with the tractor.

In use, the machine is drawn across the grain field by any suitable means, such as a tractor, and when the engine 43 is started the shaft A will be driven and the various elements will be set in motion. The grain in the path of the machine will be cut by the cutters 7 and fall on to the aprons 13 and carried thereby rearwardly beneath the beater 21 and will pass between the concave 18 and the cylinder 17. The grain which is separated will gravitate into the trough 22 and the straw will be deposited on the conveyor 30. Any grain which falls from the conveyor will gravitate down the inclined bottom wall of the discharge passage into the trough 22, as will be obvious. The straw will be discharged from the conveyor 30 through the down turned open portion 25. The grain in the trough 22 is moved toward the hopper 40 and is elevated and deposited in said hopper by the elevator 50. The grain is cleaned in the usual manner by the fan or blower 41 and passes into the elevator 51 which conducts the same to any desired point. If desired, the mechanism may be operatively connected with one of the supporting wheels 2 for actuation thereby when the machine is traveling over the ground or said mechanism may be operatively connected to a suitable power take-off device provided on the tractor.

It is believed that the many advantages of a harvester constructed in accordance with this invention will be readily understood, and although the preferred embodiment of the invention is as illustrated and described, it is to be understood that changes in the details of construction may be had which will fall within the scope of the invention as claimed.

What is claimed is:—

1. A harvester of the character described comprising, in combination, a mobile housing, a fixed platform disposed above the housing, a forwardly projecting pan pivotally connected for swinging movement in a vertical plane to the forward end portion of the housing, a cutter bar mounted on the forward end of the pan, and aprons operatively mounted on the pan, a pair of arms pivotally connected to the platform and extending forwardly therefrom, a reel rotatably supported on the arms, means for connecting the arms to the pan for swinging movement therewith, manually operable means for swinging the pan in a manner to adjust the forward end portion thereof with respect to the ground.

2. A harvester of the character described comprising, in combination, a mobile housing, a fixed platform disposed above the housing, a forwardly projecting pan pivotally connected for swinging movement in a vertical plane to the forward end portion of the housing, a cutter bar mounted on the forward end of the pan, an apron operatively mounted on the pan, a pair of arms pivotally connected to the platform and extending forwardly therefrom, a reel rotatably supported on the arms, links operatively connecting the arms to the pan for swinging movement therewith, manually operable means for swinging the pan in a manner to adjust the forward end portion thereof with respect to the ground, said means comprising a bell crank lever mounted for swinging movement on the platform and a connecting rod operatively connected to the lever and to the pan.

In testimony whereof I affix my signature.

PATRICK HENRY FILBIN.